(12) United States Patent
Kaidi

(10) Patent No.: US 12,177,247 B2
(45) Date of Patent: Dec. 24, 2024

(54) SECURITY ENGINE AUDIT RULES TO PREVENT INCORRECT NETWORK ADDRESS BLOCKING

(71) Applicant: PAYPAL, INC., San Jose, CA (US)

(72) Inventor: George Chen Kaidi, Singapore (SG)

(73) Assignee: PAYPAL, INC., San Jose, CA (US)

(*) Notice: Subject to any disclaimer, the term of this patent is extended or adjusted under 35 U.S.C. 154(b) by 407 days.

(21) Appl. No.: 17/553,615

(22) Filed: Dec. 16, 2021

(65) Prior Publication Data

US 2023/0199022 A1    Jun. 22, 2023

(51) Int. Cl.
*H04L 9/40*    (2022.01)

(52) U.S. Cl.
CPC ...... *H04L 63/1458* (2013.01); *H04L 63/0236* (2013.01); *H04L 63/0263* (2013.01); *H04L 63/101* (2013.01); *H04L 63/1416* (2013.01); *H04L 63/1425* (2013.01); *H04L 63/20* (2013.01); *H04L 63/205* (2013.01)

(58) Field of Classification Search
CPC ............. H04L 63/1458; H04L 63/0236; H04L 63/0263; H04L 63/101; H04L 63/1416; H04L 63/1425; H04L 63/20; H04L 63/205
USPC ......................................................... 726/22
See application file for complete search history.

(56) References Cited

U.S. PATENT DOCUMENTS

| | | | |
|---|---|---|---|
| 7,873,695 B2* | 1/2011 | Clegg | G06Q 10/107 709/206 |
| 2016/0112538 A1* | 4/2016 | Wo | H04L 67/535 709/225 |
| 2016/0239230 A1* | 8/2016 | Sato | H04L 43/08 |
| 2019/0182214 A1* | 6/2019 | Liu | H04L 63/0263 |
| 2020/0112590 A1* | 4/2020 | Bhatia | G06N 3/042 |

FOREIGN PATENT DOCUMENTS

CN    109948333 A  *  6/2019

* cited by examiner

*Primary Examiner* — Moeen Khan
(74) *Attorney, Agent, or Firm* — Haynes and Boone, LLP

(57) ABSTRACT

Systems and methods for security engine audit rules to prevent incorrect network address blocking are disclosed. An entity such as a service provider may determine network traffic logs caused or generated by malicious web traffic and network communications, such as during a computing attack by a bad actor. The service provider may implement automated blocking controllers, which use detection rules to detect the malicious network traffic, and thereafter generate a network address blocklist that is distributed to devices, components, and servers of the service provider for network address blocking. To ensure the integrity of the detection rules, audit rules and a dynamic exclusion macro may be executed to detect when a detection rule is behaving abnormally and/or leading to anomalous results. If a detection rule is not properly blocking network addresses, the rule may be removed from execution until recovery.

20 Claims, 5 Drawing Sheets

SECURITY ENGINE AUDIT RULES TO PREVENT INCORRECT NETWORK ADDRESS BLOCKING

TECHNICAL FIELD

The present application generally relates to computer system security including network address blocking to prevent malicious network traffic, and more particularly to implementing automated audit rules and operations to prevent incorrect network address blocking by detection rules for the malicious network traffic, according to various embodiments.

BACKGROUND

Online service providers may provide services to different users, such as individual end users, merchants, companies, and other entities. When providing these services, the service providers may provide an online platform that may be accessible over a network. Thus, users may utilize a computing device to access and utilize different processes, operations, applications, and platforms of the service provider available over the network, as well as request processing of data. However, as hackers and other malicious users or entities become more sophisticated, they may perform different computing attacks and other malicious conduct with the service provider, such as attacks that lead to account takeovers (ATOS) and/or fraudulent electronic transaction processing. Service providers may identify malicious network traffic and Internet protocol (IP) addresses by implementing rules that detect when behavior by those IP addresses and/or with the network traffic violates the rules and take appropriate actions, such as blocking such IP addresses. However, rules and rules-based engines may also encounter attacks and errors that may cause network and/or IP address blocking to behave abnormally. This may require review by system developers and/or administrators to rectify, which is time consuming and resource intensive. As such, it is desirable to more accurately detect incorrect IP addresses in a faster manner during network traffic monitoring without requiring manual efforts.

Figure 1:
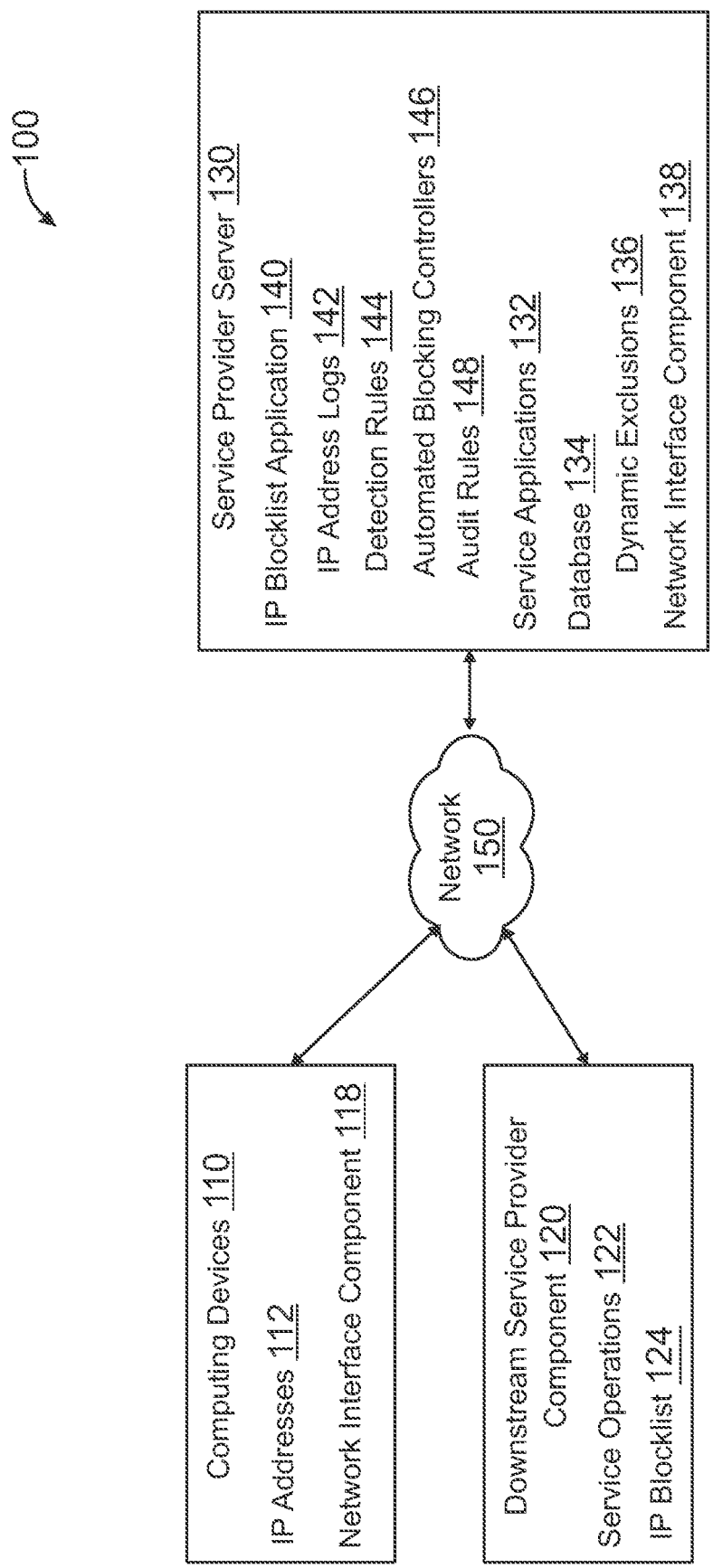
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for security engine audit rules to prevent incorrect network address blocking. Systems suitable for practicing methods of the present disclosure are also provided.

In computer systems (e.g., service provider systems), such as online platforms and systems that allow users to interact with, use, and request data processing, the computing architecture in use may face different types of computing attacks coming from malicious sources over a network. For example, a bad actor may initiate a computing attack on the computing environment of the service provider, such as an HTTP smuggling request, denial-of-service (DoS) and distributed denial-of-service (DDoS) attacks, a fraudulent transaction processing request, a password attack, a web abuse (e.g., account enumeration, brute force attacks, SQL injection), or other type of computing attack. This computing attack may introduce risk to resources of the service provider, secure and sensitive data, and/or fraud and loss by the service provider. In order to identify, remedy, stop, and/or prevent these computing attacks and other abuses of the service providers, the service providers may implement automated blocking controllers (ABCs), which function to identify malicious network traffic and corresponding network/IP addresses, and block those addresses for at least a time period in a network/IP address blocklist (e.g., a blacklist of malicious or potentially fraudulent IP addresses being used by bad actors or other malicious entities). ABCs may utilize and/or receive network/IP addresses for blocking from detection and/or blocking rules, which designate certain behaviors, network traffic log parameters, IP address locations, and other parameters of network traffic as malicious and/or fraudulent. This in turn may be used to determine whether to block corresponding network/IP addresses.

However, certain computing attacks may target ABCs and/or detection rules or may cause errors and inconsistent or anomalous results in ABCs and/or detection rules due to the nature, activity, and/or parameters of the attack. At other times, different network traffic and logs and/or bugs/errors may also cause anomalous results, which may require updating. If a blocklist is created and transmitted to downstream devices, servers, and other components of a service provider's computing architecture, it may be difficult to rollback and/or flush. For example, rollback would require specific configuration of all the different types of devices, servers, components, and other appliances, as well as the applications and services running on those appliances, their current states, and their corresponding interfaces with external devices and network traffic. Further, flushing of the blocklist may encounter similar issues and may make the service provider vulnerable to computing attacks by network addresses properly identified in the blocklist.

In this regard, the service provider may implement a failsafe with audit rules and an audit rules processor or engine that may be used to prevent anomalous network address blocking. For example, the audit rules may be run by the processor to identify whether one or more detection rules is providing anomalous results and/or blocking network addresses outside of a baseline, deviation of the baseline, and/or threshold. If so, a dynamic exclusion macroinstruction or macro may be executed as a set of operations to remove, sieve out, and/or pull one or more detection rules that are causing the abnormal results from the baseline or threshold. The rule may then be executed on computing nodes that determine when the rule(s) have been recovered and/or are no longer detecting anomalous results (e.g., when the computing attack has ended, the rule has been updated, and/or the network traffic and logs are no longer causing the anomalous results), at which time the dynamic exclusion macro may reactivate or reenable the rule(s) with one or more ABCs for future detection of malicious network addresses and/or blocklist creation.

For example, a service provider, which may provide services to users including electronic transaction processing such as online transaction processors (e.g., PayPal®), may allow merchants, users, and other entities to process transactions, provide payments, and/or transfer funds between these users. The user may also interact with the service provider to establish an account and provide other information for the user that may be used with computing services and/or stored for future use and services. The service provider and other service providers may also provide additional computing services, including social networking, microblogging, media sharing, messaging, business and consumer platforms, etc. In order to utilize the computing services of a service provider, the service provider may provide a computing architecture and environment where the users may access and utilize operations provided by the service provider. However, malicious end users and/or computing devices (e.g., computing devices that may include malware, viruses, and the like that may be hijacked to automate computing attacks) may attempt to abuse the service provider's systems through computing attacks.

To address this, in one embodiment, the service provider may provide network/IP address blocklists that are created for malicious network traffic and utilized to limit such malicious traffic from one or more network/IP addresses and/or corresponding devices, servers, and/or endpoints. The service provider's security systems, platforms, and applications, such as a security information and event management (SIEM) system, may identify and determine a malicious network traffic log, such as a network traffic log coming through web traffic to a particular domain or platform of the service provider. The traffic log may correspond to an entry that includes different data fields or attributes. For example, different traffic logs may include fields or attributes, such as user agent string, source (e.g., a source IP address), source port, method, account number, status, uniform resource identifier (uri)_path, destination, destination port, bytes out, bytes in, etc. Other potential log fields may include country, city, uniform resource locator (url), duration, request_length, url_query, ASN (autonomous system number), email, language, cdn_region, referrer, isp_network, content_type, event_type, application, domain, filename, signature, category, number_of_packets, threat, access_token, user, connection status, protocol, browser_type, device_type, action, is_ip_proxy, response_code, time_intervals_waf_rules, threat, category, content_length, x-forwarded-for_port, headers, account_number, visitor_id, api_name, ssl_cipher, timeout. Each of these fields may correspond to different data within the field. The network traffic log may originate from an IP address, also referred to herein as a network address, which may also correspond to other identifiers and/or addresses used for network communications including IP addresses, media access control (MAC) addresses, and the like. Additional blocklists may also be generated for different types of identifiers, including user and/or account names, device identifiers and/or fingerprints, application and/or service provider endpoints, relay devices and routers, and the like.

The malicious network traffic logs and/or IP addresses are determined from one or more domains of the service provider over a selected time period and may include all other network traffic logs or a subset of the network traffic logs (e.g., taken through sampling all logs detected over that time period). The logs and/or time period may be selected based on the corresponding time period for the IP address blocklist and/or analysis period. Thereafter, the service provider may determine IP addresses to block using one or more ABCs that take as input the network traffic logs and/or IP addresses and make decisions, based on detection and/or blocking rules, of whether those IP addresses are indicative of malicious network traffic and/or use by malicious computing devices. For example, if the IP addresses is involved in many failed logins over a short period of time (e.g., a credential stuffing bot attack), the IP address may be malicious. Similarly, other activity and/or parameters from one or more network traffic logs and activity of an IP address may indicate whether the IP address is suspicious, engaging in or likely to engage in fraud, and/or being used by a bad actor or malicious entity.

The service provider may then utilize the ABCs when providing an online platform and computing system for computing services utilized by end users, including customers, merchants, business entities, and the like of the service provider. The service provider may detect IP addresses for blocking by the detection rules of the ABCs, which may lead to addition of the IP addresses to an IP address blocklist or the like, generate the blocklist, and push or transmit that blocklist to different computing devices, servers, applications, components, and/or other appliances of the computing system of the service provider. The blocklist may then be used for blocking certain IP addresses and/or increasing scrutiny of those addresses when network traffic is detected from those addresses and computing services and/or processing is requested.

During using of the ABCs, a failsafe or other monitoring operation of one or more of the ABCs may detect that an ABC and/or detection rules is/are behaving anomalously and/or providing inconsistent, incorrect, erroneous, or abnormal results. For example, the ABC may be blocking a larger number or amount of IP addresses than normal, and thus differing from a normal blocking pattern and/or baseline. This may correspond to blocking 800,000 more IP addresses than the normal 1,000,000 addresses detected and blocked. However, this may also be a lower amount, such as blocking only 100,000 when 1,000,000 are normally blocked. In other embodiments, a threshold number or percentage that is higher or lower than a baseline, established, or average volume of blocked IP addresses may be used. The failsafe may also detect this from a specific detection rule of the ABC, which may correspond to a rule causing the anomalous results. While the failsafe may block based on the volume and/or volume change of blocked IP addresses, other blocking may also be used. For example, during a computing attack, a number of CAPTCHAs or other automated tests may be failed by bots used for the computing attacks, which may cause a rule to block more IP addresses. However, due to the computing attack, the rule may be behaving correctly and thus is returning anomalous but correct results. In contrast, a computing attack may also cause a detection rule to behave abnormally, such as rate detection and limiting detection rules, which should be removed until an end of the attack and recovery while other detection rules are used for malicious IP address detection.

As such, additional qualitative tests may be performed in addition to the quantitative test for volume changes in IP address block rate.

The failsafe may be implemented when the ABC and/or detection rule is behaving abnormally and/or returning too high or low of IP address blocking results from a norm, baseline, and/or established number of results. The failsafe may then bring the ABC and/or the detection rule offline and/or prevent from sending results to an IP address blocklist used with other appliances of the computing system and architecture of the service provider. The failsafe may also or instead remove the IP addresses designated for blocking by the faulty ABC and/or detection rule from being added to the IP address blocklist (and/or from the blocklist if generated in a data table but not yet distributed to downstream and other appliances). However, the failsafe may not always be required and instead the audit rules and audit rule engine and/or system may continuously run with the ABCs and detection rules.

Based on the anomalous results by the ABC and/or detection rule, audit rules for the detection rules and/or ABCs are invoked and run using an audit rules engine and/or system. Although the audit rules engine may be executed in response to the failsafe being triggered, as described above, the audit rules and rule engine may not need or be restricted to executing in response to the failsafe being triggered and may be continuously and/or periodically executed with the ABCs and detection rules, as well as be executed in response to the anomalous detection results and IP address blocking even if the failsafe is not triggered (or not implemented for the specific IP address blocking system). Audit rules may include rules associated with an IP address blocking number baseline or threshold, an IP address blocking frequency baseline or threshold, or an IP address blocking regional requirement, baseline, or threshold. For example, audit rules may include detection of job processing errors by the ABC with the detection rules, execution failures associated with processing the network traffic logs and/or IP addresses, a number of detected IP addresses being in an IP address whitelist, and/or a number of the IP addresses detected by a detection and blocking rule within a time frame being out of a range, baseline, or threshold. These parameters may be detected by the audit rules when the ABC and/or detection rule processes network traffic logs and/or IP addresses for detection of malicious traffic and/or addresses.

Utilizing the audit rules, the audit rules engine may identify one or more detection rules that are behaving abnormally and/or providing anomalous results that are inconsistent with a baseline, standard or normal results, or the like. In some embodiments, the detection rules may be run with a sampling or set of network traffic logs and/or IP addresses to determine if each detection rule is behaving correctly or anomalously. This may also be done by analyzing the detection rates with a live computing environment and live traffic, such as by analyzing rules detection of potentially malicious network traffic and/or IP addresses when utilized by ABCs and other decision services. Further, the detection rule may be run multiple times within the same time window to detect anomalous results, such as twice or more on two or more separate computing nodes, to compare results and/or hashes of those results for integrity checks of whether the rule(s) are behaving normally or abnormally when providing resulting identification of potentially malicious IP addresses. These operations allow the audit rules to sieve out and/or determine the abnormally running jobs for detection rules by the ABCs, where those rules and/or identification of those rules may be written to a lookup/list for use in exclusion with additional IP address detection and identification as malicious by the ABC(s).

A dynamic exclusion macro may be used to pull, set aside in another computing environment (e.g., move to a test computing environment from a production computing environment for the ABCs and network traffic), and/or otherwise remove from a pool of detection rules used by one or more ABCs for malicious IP address detection and blocking. The dynamic exclusion macro may correspond to one or more coded scripts, automated actions, and/or operations, which may utilize a decision by one or more audit rules of the audit engine to identify and remove or sequester a detection rule when identified as violating the audit rule(s). When removing a detection rule that is providing poor or inaccurate results, such as by blocking too many or too little IP addresses (e.g., blocking valid addresses or missing malicious addresses, such as too many false positives or true negatives, respectively), the dynamic exclusion macro may also prevent IP addresses identified using the rule from being added to the IP address blocklist and/or remove those IP addresses from a pending but yet to be released and distributed IP address blocklist.

The ABC may then be allowed to run as normal without the detection rule(s) that are causing anomalous results identified by the audit rules and engine. The detection rule(s) may be set aside from use with one or more ABCs and/or quarantined in another computing environment, which allows testing of those rules. The identified detection rule(s) may be run on one or more computing nodes and/or systems in the test environment to determine whether results with test traffic (which may correspond to the live traffic, such as a sampling over time of live network traffic) return to a baseline and/or are within a norm to consider each detection rule as providing consistent and/or normal results. This may include looking for and/or determining whether the detection rule and/or malicious IP address detection has recovered based on execution of the rule with test ABCs or other operations. In some embodiments, the anomalous results for a rule may be end when a crash or system error recovers, the detection rule and/or ABC is updated, and/or the computing attack ends or is defeated and blocked. Thus, recovery may also be detected when additional computing actions occur.

Once the rule has recovered, the rule may be added back to the pool of running detection rules for the ABCs, such as using the dynamic exclusion macro or another operation to reenable and/or reactivate the detection rule that was excluded. The ABCs may the use the pool including the rule previously excluded from the pool, which may continue to be monitored and checked for violating the failsafe and/or one or more of the audit rules. Thus, a two-layer solution may be provided to IP address blocklist creation, which uses integrity checks on the detection rules and blocklist to prevent or minimize blocking of valid IP addresses. Further, one or more additional layers, such as a third layer, may be utilized in a similar manner to check the integrity of audit rules when analyzing the detection rules, such as by ensuring the audit rules are not improperly identifying detection rules that are within baselines, below or at detection thresholds for abnormal behavior, and/or returning correct results. This allows for faster recovery from computing attacks and system errors or crashes, which allows for more accurate IP address blocklist creation and detection of malicious IP addresses. Further, the operations may be performed in an automated manner without manual efforts for rollback and/or detection rule integrity analysis, which allows for improved computing operations and security across service providers' computing systems and architecture. While IP addresses and other network addresses/identifiers are discussed herein, other types of addresses and/or identifiers may be used. For example, device specific identifiers, account and/or user identifiers, application session identifiers or tokens, and the like may also be monitored for blocking by SIEM systems and therefore utilize the audit rules and audit rule engine and system described herein.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an operating system (OS) such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

System 100 includes computing devices 110 (only one of which is shown), downstream service provider component 120, and a service provider server 130 in communication over a network 150. Computing devices 110 may be utilized by valid users with service provider server 130, as well as malicious users or other bad actors to perform some computing attack against service provider server 130 over network 150. Service provider server 130 may provide various computing services, data, operations, and other functions over network 150 to computing devices 110. In this regard, service provider server 130 may identify IP addresses or other network addresses and/or identifiers for malicious ones of computing devices 110 and add those to a blocklist. The blocklist may be maintained and checked for integrity using audit rules by service provider server 130, for example, to prevent blocking of IP addresses for valid ones of computing devices 110. Once generated, the blocklist may be pushed or distributed to computing appliances of the computing architecture of service provider server 130, such as downstream service provider component 120.

Computing devices 110, downstream service provider component 120, and service provider server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Computing devices 110 may be implemented as one or more communication devices that may utilize appropriate hardware and software configured for wired and/or wireless communication with service provider server 130. For example, in one embodiment, one or more of computing devices 110 may be implemented as a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data. Although a plurality of devices is shown, each individual computing device may function similarly and/or be connected with service provider server 130 to provide the functionalities and engaging in the operations described herein.

Computing devices 110 of FIG. 1 contains IP addresses 112, applications, databases, and a network interface component 114. The applications may correspond to executable processes, procedures, and/or applications with associated hardware. In other embodiments, computing devices 110 may include additional or different modules having specialized hardware and/or software as required.

Computing devices 110 may execute one or more applications and have one or more instances of corresponding applications running to interact with service provider server. The applications may correspond to one or more processes to execute software modules and associated components of computing devices 110 to provide features, services, and other operations to users over network 150, which may include accessing and/or interacting with service provider server 130. In this regard, the applications may correspond to software utilized by computing devices 110 to access a website or UI provided by service provider server 130 to perform actions or operations with service provider server 130. In various embodiments, the applications may correspond to one or more general browser applications configured to retrieve, present, and communicate information over the Internet (e.g., utilize resources on the World Wide Web) or a private network. For example, the applications may provide a web browser, which may send and receive information over network 150, including retrieving website information (e.g., a website for a merchant), presenting the website information to the users, and/or communicating information to the website.

However, in other embodiments, the applications may include dedicated software applications of service provider server 130 or other entities (e.g., merchants, item ordering and/or delivery services, and/or other sellers and service providers). The applications may be associated with account information, user financial information, and/or transaction histories. In some embodiments, additional and/or different services may be provided via the applications, including messaging, social networking, media posting or sharing, microblogging, data browsing and searching, online shopping, and other services available through service provider server 130. Thus, the applications may also correspond to different service applications and the like.

In order to interact over network 150, such as with downstream service provider component 120 and/or service provider server 130, computing devices 110 may obtain IP addresses 112, which correspond to unique addresses used to identify each of computing devices 110 on network 150, such as over the Internet. IP addresses may be used to transmit and receive information over network 150, such as using an identifier assigned based on the standards and requirements for Internet protocol (IP) rules. Thus, IP addresses 112 may be used when requesting use of computing services from downstream service provider component 120 and/or service provider server 130 and/or otherwise interacting with downstream service provider component 120 and/or service provider server 130 over network 150. IP addresses 112 may be used to send and receive network traffic and therefore be associated with and/or logged in one or more network traffic log, such as IP address logs for network traffic from and/or corresponding to IP addresses 112.

However, when using the applications, a bad actor may execute a computing attack to perform some operation to compromise service provider server 130 and/or conduct fraud, which may utilize one of IP addresses 112. For example, the computing attack may attempt to discover secret or sensitive information, takeover an account, request fraudulent electronic transaction processing, or otherwise perform an illegal action or conduct that is barred by the rules and regulations of service provider server 130. In some embodiments, a computing attack may correspond to a HTTP smuggling request, DoS and DDoS attacks, a fraudulent transaction processing request, a password or eavesdropping attack, a session hijacking or MitM attack, or other type of computing attack. In other embodiments, one or more of computing devices 110 may also or instead be used for fraudulent purposes or otherwise be compromised, and thus corresponding ones of IP addresses 112 used by such devices may be identified for blocking to prevent other types of or subsequent fraud, abuse, or malicious activity.

During the computing attack, network traffic logs may be generated based on web traffic and network communications between a corresponding malicious one of computing devices 110 and service provider server 130, which may be analyzed by service provider server 130 based on a corresponding one of IP addresses 112. Service provider server 130 may utilize one or more detection rules with one or more ABCs to identify and add malicious ones of IP addresses to an IP address blocklist. However, computing attacks, system crashes and/or processing errors, required rule and/or system updates, and other events may cause the ABCs to provide anomalous and/or erroneous results. The detection rules, ABCs, and/or resulting blocking recommendations of IP addresses 112 may be analyzed using audit rules, as discussed herein.

Although a single malicious computing device, attack, and IP address is discussed above, multiple of IP addresses 112 may be involved in the same, similar, or different computing attacks using multiple ones of computing devices 110, which may similarly provide network traffic logs for the corresponding one of IP addresses 112. Thus, service provider server 130 may designate multiple ones of IP addresses 112 for blocking correctly or erroneously based on corresponding detection rules. Thus, identification of IP addresses 112 for blocking may be analyzed for anomalous results by service provider server 130, as described herein.

Each of computing devices 110 may further include one or more databases stored on a transitory and/or non-transitory memory of computing devices 110, which may store various applications and data and be utilized during execution of various modules of computing devices 110. The database may include, for example, identifiers such as operating system registry entries, cookies associated with the applications, identifiers associated with hardware of computing devices 110, or other appropriate identifiers, such as identifiers used for payment/user/device authentication or identification, which may be communicated as identifying a corresponding user and/or corresponding one of computing devices 110 to service provider server 130. Moreover, the databases may store operations and data associated with use of computing services when sending and receiving network traffic using IP addresses 112.

Computing devices 110 includes network interface component 118 adapted to communicate with downstream service provider component 120, service provider server 130, and/or other devices, servers, and system appliances over network 150. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including WiFi, microwave, radio frequency, infrared, Bluetooth, and near field communication devices.

Downstream service provider component 120 may be maintained, for example, by an online service provider, which may be used to provide services to users via computing devices 110 which may be used with service provider server 130 and/or other components and appliances of service provider server 130. In this regard, downstream service provider component 120 includes one or more processing applications which may be configured to interact with computing devices 110 based on an IP blocklist 124, which may be used to block or prevent communication with one or more of computing devices 110 based on blocked ones of IP addresses 112 in IP blocklist 124. In one example, downstream service provider component 120 may be provided by PAYPAL®, Inc. of San Jose, CA, USA for use with service provider server 130. However, in other embodiments, downstream service provider component 120 may be maintained by or include another type of service provider (e.g., an external third-party service provider) and may receive IP blocklist 124 from service provider server 130 for IP address blocking.

Downstream service provider component 120 of FIG. 1 includes service operations 122 and IP blocklist 124. Service operations 122 may correspond to executable processes, procedures, and/or applications with associated hardware. In other embodiments, downstream service provider component 120 may include additional or different modules having specialized hardware and/or software as required.

Service operations 122 may correspond to one or more processes to execute modules and associated specialized hardware of downstream service provider component 120 to provide one or more computing services to users, such as a server, router, device, database and/or data repository, and the like. In this regard, service operations 122 may correspond to specialized hardware and/or software used by downstream service provider component 120 to provide service operations 122, for example, for account signup and usage, account maintenance and administration, payments and electronic transaction processing, merchant marketplaces and merchant services, and the like. Service operations 122 may also be associated with email, messaging, social networking, media posting or sharing, microblogging, data browsing and searching, online shopping, and other services. During provision of the services, IP blocklist 124 may be used to block one of IP addresses 112 occurring or being found in one or more lists, such as a data table having rows for blocked IP addresses and other data. IP blocklist 124 may be received from service provider server 130, which may be pushed to, retrieved by, and/or otherwise transmitted to downstream service provider component 120 when generated and verified. Verification may include performing validity and integrity checks on IP blocklist 124 using audit rules and an audit rules engine, as described herein. IP blocklist 124 may be received by downstream service provider component 120 at a certain time and may be updated, overwritten, or changed at a certain time interval, such as after a certain amount of time or time period (e.g., every six hours, day, etc.).

Service provider server 130 may be maintained, for example, by an online service provider, which may provide operations for detection of malicious and/or fraudulent IP addresses based on network traffic and traffic logs. In this regard, service provider server 130 includes one or more processing applications, which may be configured to interact with computing devices 110 to provide services to users, which may utilize downstream service provider component 120. Further, service provider server 130 may include one or more processing applications, which may be configured to detect whether computing devices 110 and/or IP addresses 112 are potentially being used by malicious or fraudulent entities and generated IP blocklists that are checked for integrity and validity using audit rules. In one example, service provider server 130 may be provided by PAYPAL®, Inc. of San Jose, CA, USA. However, in other embodiments, service provider server 130 may be maintained by or include another type of service provider.

Service provider server 130 of FIG. 1 includes an IP blocklist application 140, service applications 132, a database 134, and a network interface component 138. IP blocklist application 140 and service applications 132 may correspond to executable processes, procedures, and/or applications with associated hardware. In other embodiments, service provider server 130 may include additional or different modules having specialized hardware and/or software as required.

IP blocklist application 140 may correspond to one or more processes to execute modules and associated specialized hardware of service provider server 130 to provide a framework to detect and protect against computing attacks, fraud, and/or compromised accounts by generating IP blocklists of IP addresses for blocking based on suspicious or fraudulent activity. In this regard, IP blocklist application 140 may correspond to specialized hardware and/or software used by service provider server 130 to first determine one or more IP address logs 142, which may include different types of network traffic logs corresponding to network traffic over a time period. IP address logs 142 may include valid and innocuous behavior and computing service usage, as well as malicious behavior, fraud, and/or computing attacks. The malicious IP address log(s) may correspond to an attempt to compromise the security and/or data of service provider server 130, execute some fraudulent action, or otherwise preform an illegal or illicit computing action, such as an account takeover, session hijacking, and the like. Within IP address logs 142, different fields or attributes may include different data including IP addresses 112, computing devices 110, and/or other data, activities, and the like associated with that network traffic.

For example, IP address logs 142 may include fields or attributes for a user agent string, source IP address, source port, method, account number, status, uniform resource identifier (uri)_path, destination, destination port, bytes out, bytes in, etc. Other potential log fields may include country, city, uniform resource locator (url), duration, request_length, url_query, ASN (autonomous system number), email, language, cdn_region, referrer, isp_network, content_type, event_type, application, domain, filename, signature, category, number_of_packets, threat, access_token, user, connection_status, protocol, browser_type, device_type, action, is_ip_proxy, response_code, time_intervals_waf_rules, threat, category, content_length, x-forwarded-for_port, headers, account_number, visitor_id, api_name, ssl_cipher, timeout.

Using IP address logs 142, detection rules 144 may be ran and executed using a malicious or fraudulent IP address detection mechanism and/or engine for automated blocking controllers 146 (ABCs 146). This may be done to identify IP addresses to add to an IP address blocklist, such as IP blocklist 124 provided to downstream service provider component 120 for blocking of one or more of IP addresses 112 when providing computing services to computing devices 110. ABCs 146 may utilize detection rules 144 with IP address logs 142 to detect and identify potentially malicious or fraudulent IP addresses (as well as those identified as engaging in fraud, computing attacks, or other malicious behavior). ABCs 146 may designate for blocking a set of IP addresses 112 using detection rules 144. However, there may be events, such as system errors or crashes, computing attacks, required updates, and the like, that cause ABCs 146 to behave abnormally and provide anomalous results, such as identifying too many or too few IP addresses and identifying validly used IP addresses for blocking (e.g., false positives) or failing to identify maliciously or fraudulently used IP addresses for blocking (e.g., true negatives). Thus, detection rules 144 may be required to be analyzed for any rules that may be breaking or causing computing errors and issues with ABCs 146, such as those behaving abnormally and causing the results that are outside of a deviation from a baseline, over or under a threshold, a certain percentage different than a normal or average over a time period, or the like.

Audit rules 148 may be executed using an audit and/or integrity check engine and system. Audit rules 148 may correspond to a set of rules to analyze detection rules 144 for one or more detection rules causing ABCs 146 to behave abnormally or deviate for a standard IP address identification and selection for blocking in an IP address blocklist. Audit rules 148 may be accessed and used to identify which one(s) of detection rules 144 are required to be brought offline, isolated or quarantined, and/or tested for errors and recovery in a test computing environment. This may be triggered in response to a failsafe being implemented based on one or more of ABCs 146 detecting IP addresses and designating as malicious, compromised, or fraudulent out of a baseline, over or under a threshold, or otherwise providing anomalous results. However, audit rules 148 may also be continuously or periodically run for detection rules 144 to detect anomalous results and abnormal behavior by one or more of detection rules 144, and therefore not require a trigger condition.

Once one or more of detection rules 144 is identified as causing the anomalous results, a dynamic exclusion macro may be executed to remove the rule(s) from the pool of detection rules 144. When doing so, the rule(s) may first be tested on two or more separate computing nodes with audit rules 148 to ensure that the rule is causing the anomalous results and/or that the rule is behaving abnormally and not correctly detecting results but the IP addresses to be blocked are increased/decreased due to the network traffic and logs (e.g., during a computing attack, where a spike in IP addresses to block may be observed). After removing the rule(s) from the pool for detection rules 144, ABCs 146 may continue to execute and generate an IP address blocklist, which may be distributed to other components by IP blocklist application 140. Thereafter, the rule(s) that are removed may be tested and, when recovered and/or after a set amount of time, may be added back to the pool to allow ABCs 146 to use those excluded rules again. The components, operations, and communications to generate and verify IP address blocklists using audit rules 148 that check the integrity of detection rules 144 are discussed in more detail with regard to FIGS. 2-4 herein.

Service applications 132 may correspond to one or more processes to execute modules and associated specialized hardware of service provider server 130 to process a transaction or provide another service to customers, merchants, and/or other end users and entities of service provider server 130. In this regard, service applications 132 may correspond to specialized hardware and/or software used by service provider server 130 to providing computing services to users, which may include electronic transaction processing and/or other computing services using accounts provided by service provider server 130. In some embodiments, service applications 132 may be used by users associated with computing devices 110 to establish user and/or payment accounts, as well as digital wallets, which may be used to process transactions. In various embodiments, financial information may be stored with the accounts, such as account/card numbers and information that may enable payments, transfers, withdrawals, and/or deposits of funds. Digital tokens for the accounts/wallets may be used to send and process payments, for example, through one or more interfaces provided by service provider server 130. The digital accounts may be accessed and/or used through one or more instances of a web browser application and/or dedicated software application executed by computing devices 110 and engage in computing services provided by service applications 132. Computing services of service applications 132 may also or instead correspond to messaging, social networking, media posting or sharing, microblogging, data browsing and searching, online shopping, and other services available through service provider server 130.

In various embodiments, service applications 132 may be desired in particular embodiments to provide features to service provider server 130. For example, service applications 132 may include security applications for implementing server-side security features, programmatic client applications for interfacing with appropriate application programming interfaces (APIs) over network 150, or other types of applications. Service applications 132 may contain software programs, executable by a processor, including a graphical user interface (GUI), configured to provide an interface to the user when accessing service provider server 130 via one or more of computing devices 110, where the user or other users may interact with the GUI to view and communicate information more easily. In various embodiments, service applications 132 may include additional connection and/or communication applications, which may be utilized to communicate information to over network 150.

Additionally, service provider server 130 includes database 134. Database 134 may store various identifiers associated with computing devices 110. Database 134 may also store account data, including payment instruments and authentication credentials, as well as transaction processing histories and data for processed transactions. Database 134 may store financial information or other data generated and stored by service applications 132. This may include data from one or more operations provided by service applications 132, which may also include account data and/or user interactions, as well as network traffic logs and/or other data associated with IP addresses 112 and corresponding communications to and from IP addresses 112. Thus, database 134 may include IP address logs 142 that may be analyzed blocking of one or more of IP addresses 112, including malicious network traffic logs that may be blocked or excluded by IP blocklist application 140. In this regard, when blocking one or more of IP addresses 112, dynamic exclusions 136 may be determined by IP blocklist application 140 for one or more of detection rules 144 that are excluded while causing anomalous results.

In various embodiments, service provider server 130 includes at least one network interface component 138 adapted to communicate computing devices 110, downstream service provider component 120, and/or other devices, servers, and components over network 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including WiFi, microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
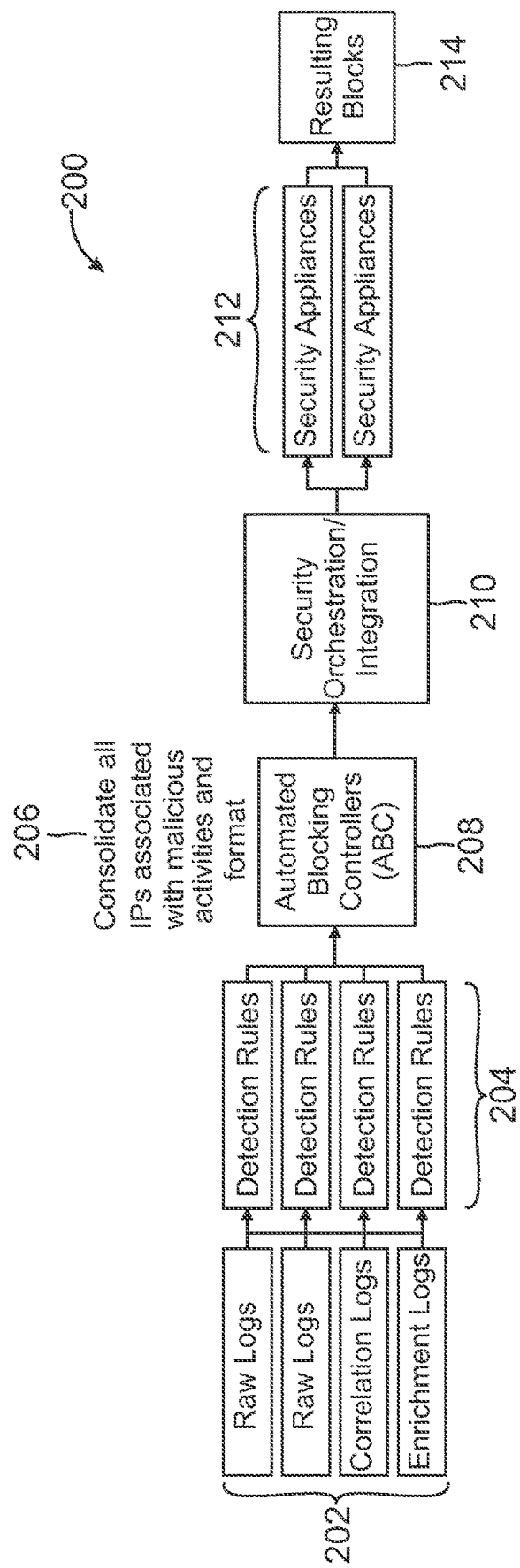
FIG. 2 is an exemplary system environment having automated blocking controllers for network addresses that utilize detection rules that may be checked for proper execution and integrity using audit rule, according to an embodiment.

FIG. 2 is an exemplary system environment 200 having automated blocking controllers for network addresses that utilize detection rules that may be checked for proper execution and integrity using audit rule, according to an embodiment. System environment 200 includes components of a service provider's computing systems and architecture that may be used when blocking IP addresses that may be identified as malicious, fraudulent, or compromised, such as the components and operations utilized by service provider server 130 when executing IP blocklist application 140 discussed in reference to system 100 of FIG. 1. In this regard, service provider server 130 may utilize the components in system environment 200 to check the integrity of and prevent anomalous and incorrect IP address blocking.

In system environment 200, initially a set of network traffic logs 202 are accessed, sampled, and/or fed to an IP address detection engine that implements detection rules 204. Network traffic logs 202 may correspond to a set of logs for network traffic received from one or more computing devices over a network based on usages of computing services, requests for data processing, communications, and the like. Network traffic logs 202 may therefore include multiple fields for different data including fields for IP addresses for originating devices or servers of network traffic log 202 and/or other devices/servers utilized in the transmission of network traffic logs 202 to the service provider's systems. Network traffic logs 202 may include raw logs, correlation logs, enrichment logs, and the like.

Detection rules 204 may then be invoked to be utilized with an IP addresses detection mechanism and/or system for identification of malicious, fraudulent, and/or compromised IP addresses associated with network traffic logs 202. Detection rules 204 may correspond to malicious, fraudulent, or compromised IP address detection rules that may cache network traffic, such as malicious traffic, based on rule logic. Detection rules 204 and/or a rules engine or operations, may then extract IP addresses for use with ABCs 208. A consolidation operation 206 may be executed with ABCs 208 to consolidate the IP addresses associated with malicious logs from network traffic logs 202 and format those logs into a standard data format for use with an IP address blocklist. For example, the corresponding logs and/or IP addresses may be formatted to the data tables' rows and/or columns of data tables for one or more IP address blocklists.

When performing identification of malicious activities and IP addresses, detection rules 204 and/or corresponding ones of ABCs 208 may behave abnormally, such as if one of detection rules 204 is causing too many IP addresses to be blocked, including valid addresses that are incorrectly blocked based on rule parameters or logic and/or system guidelines and requirements. Thus, with detection rules 204 and ABCs 208, one or more audit rules and controllers may be used to ensure the effectiveness and integrity of detection rules 204 when used to provide IP addresses for blocking by ABCs 208. These audit rules may be run to determine which one(s) of detection rules 204 may be required to be pulled from an execution pool, thereby preventing the rule from being run and causing the anomalous and/or incorrect blocking. A closer view of the audit rules and audit rules engine is shown in system environment 300 of FIG. 3.

Thereafter, ABCs 208 may generate and provide an IP address blocklist for distribution to downstream devices, servers, components, and other appliances used by the service provider's computing systems (and/or external third-party systems). The IP address blocklist may be used in a security information and event management (SIEM) system, which may use a security orchestration and integration layer to push and/or otherwise distribute the IP address blocklist after integrity checks are implemented to prevent abnormally behaving ones of detection rules 204 from affecting the blocklist and/or cause anomalous and incorrect IP address blocking. Security appliances 212 may the receive the IP address blocklist, which may be used in future provision of computing services to devices associated with IP addresses. When IP addresses on the blocklist is detected, resulting blocks 214 may occur by security appliances 212, which may prevent network traffic from such IP addresses and/or endpoints.

Figure 3:
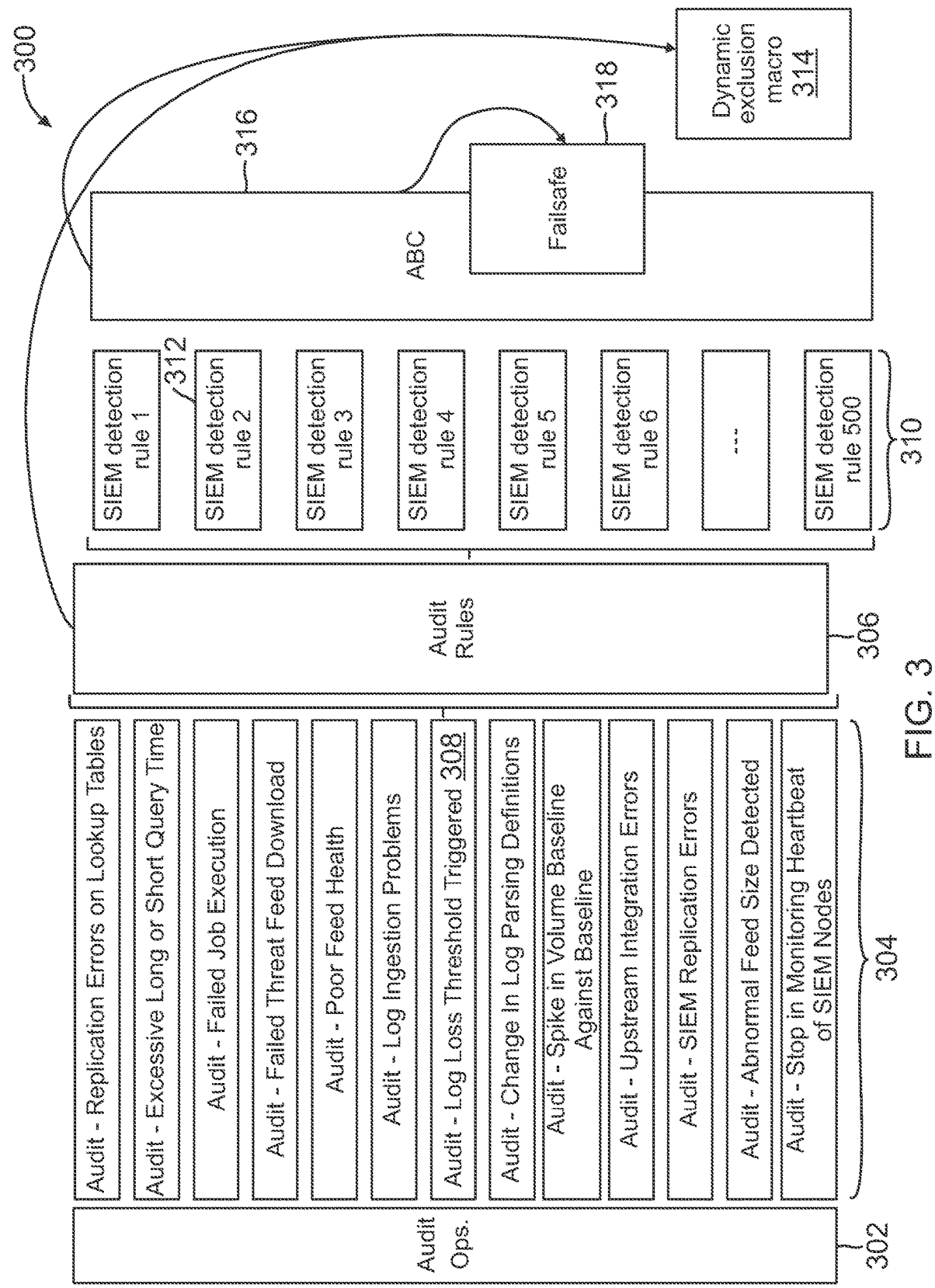
FIG. 3 is an exemplary system environment where audit rules may be used to configure detection rules used by automated blocking controllers for network address blocking, according to an embodiment.

FIG. 3 is an exemplary system environment 300 where audit rules may be used to configure detection rules used by automated blocking controllers for network address blocking, according to an embodiment. System environment 300 includes components of a service provider's computing systems and architecture that may be used for audit and integrity checks of detection rules run by an IP address detection and blocking mechanism and engine, such as the components and operations utilized by service provider server 130 when executing IP blocklist application 140 discussed in reference to system 100 of FIG. 1. In this regard, service provider server 130 may utilize the components in system environment 300 to check the integrity of and prevent anomalous and incorrect IP address blocking.

In system environment 300, audit operations (ops.) 302 include a set of operations for an engine and/or system that utilizes audit rules for determination of whether IP address detection rules for malicious or fraudulent activity are generating anomalous results due to a system error or crash, computing attack, or the like. Individual audit rules 304 may be contained in an audit rules pool 306 or other set of audit rules to monitor the detection rules of the IP address detection and blocklist creation application and operations of a service provider. Audit rules pool 306 may therefore be utilized by audit operations 302 while monitoring different ABCs and/or detection rules for abnormalities of those ABCs and/or detection rules during IP address monitoring and identification for IP address blocklists.

Individual audit rules 304 are shown in system environment 300, which may include at least a subset of the types of audit rules that may be used to determine when a detection rule is providing anomalous results. These anomalous results may therefore cause an ABC to request blocking of valid IP addresses due to the processing issue or error encountered when executing the detection rule at issue. For example, individual audit rules 304 may include whether there are replication errors on lookup tables, excessive long or short query times, failed job execution, failed threat feed download, poor feed health, log ingestion problems, log loss threshold triggered, change in log parsing definitions, a spike in volume baseline as compared against a standard or average baseline (e.g., for a time period or established for the detection rule), upstream integration errors, SIEM replication errors, abnormal feed size detection, and/or a stop in monitoring of a heartbeat (e.g., period signal sent to indicate node health and/or functioning), and/or the like. Other audit rules and/or types of audit rules may also be used in audit rules pool 306, which may also depend on the computing service associated with the ABCs and/or detection rules (e.g., electronic transaction processing, authentication, social networking, media streaming, etc.). As such, individual audit rules 304 is not exhaustive and other audit rules may also be used.

Audit operations 302 may be executed to monitor a set of detection rules, such as SIEM detection rules 310. SIEM detection rules 310 may be utilized with ABC 316 to provide recommendations and/or identification of IP addresses for blocking based on behavior and/or activity associated with those IP addresses from network traffic logs. For example, network traffic logs may indicate risk of malicious or fraudulent behavior (e.g., multiple failed logins from the same IP address), which may trigger one or more of SIEM detection rules 310 to identify the corresponding IP address for blocking. However, one or more of SIEM detection rules 310 may also be faulty, require updating, and/or behave abnormally when executed due to system errors and/or computing attacks. As such, audit operations 302 are used to monitor SIEM detection rules 310. This may be in response to a failsafe 318 being triggered when ABC 316 attempts or requests blocking of a volume or set of IP address that deviates from a baseline or threshold an amount to indicate that ABC 316 and/or one or more of SIEM detection rules 310 are provide anomalous results. However, in other embodiments, audit operations 302 may continuously or periodically be executed to monitor SIEM detection rules 310.

In this regard, SIEM detection rule 2 312 may be behaving abnormally and requesting blocking of a large number of IP addresses, a significant amount of which are valid IP addresses improperly identified as potentially malicious or fraudulent. Failsafe 318 may then be triggered with ABC 316, which may limit ABC from sending IP addresses for blocking until the issue with SIEM detection rules 310 is resolved. Further, failsafe 318 may remove any improperly identified IP addresses from a blocklist currently being generated if temporarily persisted in a data table prior to writing to the IP address blocklist data table and proliferation of that list. Audit operations 302 for audit rules pool 306 may execute to audit and check the integrity of SIEM detection rules 310. This may occur in response to failsafe 318 being triggered or at certain times/intervals.

Using audit operations 302 with audit rules pool 306 and SIEM detection rules 310, an audit rule 308 from individual audit rules 304 may be triggered. This may be triggered on detection of SIEM detection rule 312 providing anomalous results, such as where there is a log loss threshold triggered for SIEM detection rule 312. Audit rule 308 may be triggered on detection of this abnormality with network traffic log processing by SIEM detection rule 312. In this regard, dynamic exclusion macro 314 may then be executed based on the detection of SIEM detection rule 312 behaving abnormally from analysis using audit rules pool 306. Thereafter, dynamic exclusion macro 314 may pull SIEM detection rule 312 from usage with ABC 316 for IP address blocking. SIEM detection rule 312 may then be analyzed to determine when there is rule update or recovery that allows SIEM detection rule 312 to function properly with ABC 316 for IP address blocking of malicious or fraudulent addresses. Once recovered and/or updated, SIEM detection rule 312 may be added back to the pool for SIEM detection rules 310 for usage with ABC 316.

Figure 4:
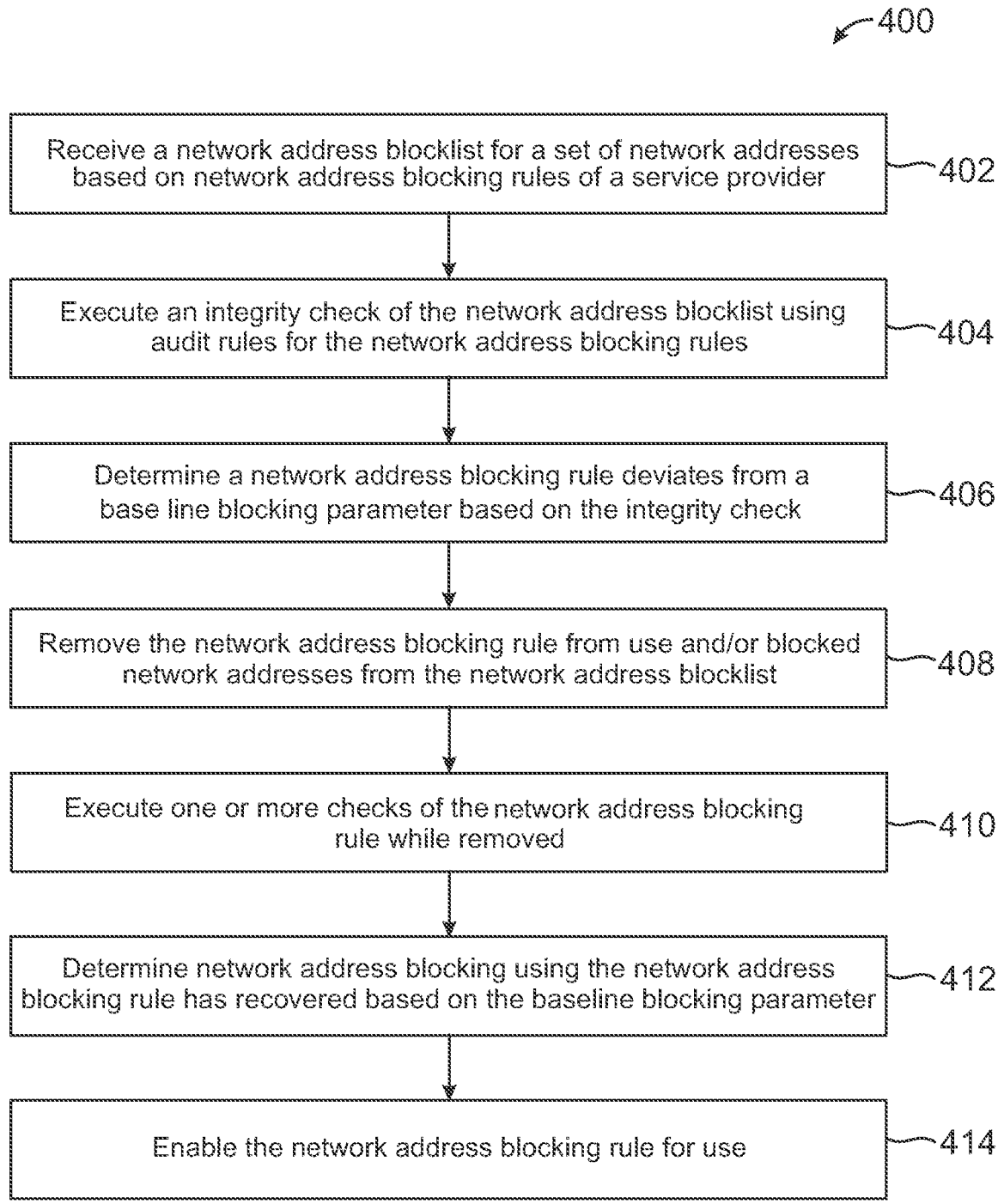
FIG. 4 is a flowchart for processes used with security engine audit rules to prevent incorrect network address blocking, according to an embodiment.

FIG. 4 is a flowchart 400 for processes used with security engine audit rules to prevent incorrect network address blocking, according to an embodiment. Note that one or more steps, processes, and methods described herein of flowchart 400 may be omitted, performed in a different sequence, or combined as desired or appropriate.

At step 402 of flowchart 400, a network address blocklist for a set of network addresses is received or accessed based on network address blocking rules of a service provider. The network addresses may correspond to IP addresses and/or other addresses or identifiers used by or determined from computing devices when communicating over a network (e.g., MAC addresses). The network address blocklist may be received, accessed, and/or generated based on the network address blocking rules and utilizing one or more ABCs. However, the network address blocklist may not be persisted and/or distributed to downstream devices. In this regard, the network address blocklist may be in the process of being created and/or the ABC(s) involved in creation of the blocklist may be providing identified IP addresses for blocking by the IP address blocklist. This may trigger a failsafe, such as if one or more ABCs is identifying a volume of IP addresses that differs from a baseline or threshold an amount that indicate a potential abnormality in the execution of one or more detection rules for IP address blocking.

At step 404, an integrity check of the network address blocklist is executed using audit rules for the network address blocking rules. The integrity check may be executed in response to the failsafe triggering; however, the integrity check may not require a trigger condition and instead may be continuously or periodically executed to check the health and operating conditions of the network address blocking rules. At step 406, a network address blocking rule deviating from a baseline blocking parameter is determined based on the integrity check. The audit rules may include conditions, parameters, and/or triggers that may be utilized to detect when a network address blocking rule is behaving abnormally, receiving anomalous traffic logs or other data (e.g., an issue with data processing, event streaming, or the like), and/or providing anomalous results for IP addresses to block. Further, when identifying the rule behaving incorrectly, multiple computing nodes may be used to ensure rule behavior and not a computing node or system error or crash. This allows for confirmation of rule behavior prior to removal from use with IP address blocking.

At step 408, the network address blocking rule and/or blocked network addresses from the network address blocklist is/are removed from use. A dynamic exclusion macro may be utilized to remove the network address blocking rule for a pool of rules used for the ABCs when designating network addresses for blocking. This may include quarantining and/or placing the rule into a test computing environment, where rule recovery and/or updating may be performed. Further, the network addresses to be blocked based on identification by that rule may be identified and may be analyzed and/or removed from the pending network address blocklist being created for proliferation to downstream devices. In this regard, if the rule provides anomalous results, at least a portion of which are incorrect and instead valid IP addresses, those addresses may be removed from the blocklist until further detection rules may be run with those addresses and/or corresponding network traffic logs to ensure valid IP addresses are not blocked.

At step 410, one or more checks of the network address blocking rule are executed while the rule is removed. In the test computing environment or another computing node that does not affect the production computing environment, the network address blocking rule may be checked and/or analyzed for recovery using additional network traffic logs and/or addresses. This may include using a portion or sampling of the network traffic in the production environment. At step 412, network address blocking using the network address blocking rule is determined to have recovered based on the baseline blocking parameter. The checks of the network address blocking rule may determine that the rule is no longer causing anomalous results that include incorrectly blocked IP addresses. At step 414, the network address blocking rule is enabled for use again. This may include adding the network address blocking rule back to the pool of rules used with the ABCs for IP address blocking. Thus, the rule, once recovered, may then be used again for IP address, or other network addresses/identifier blocking with the service provider.

Figure 5:
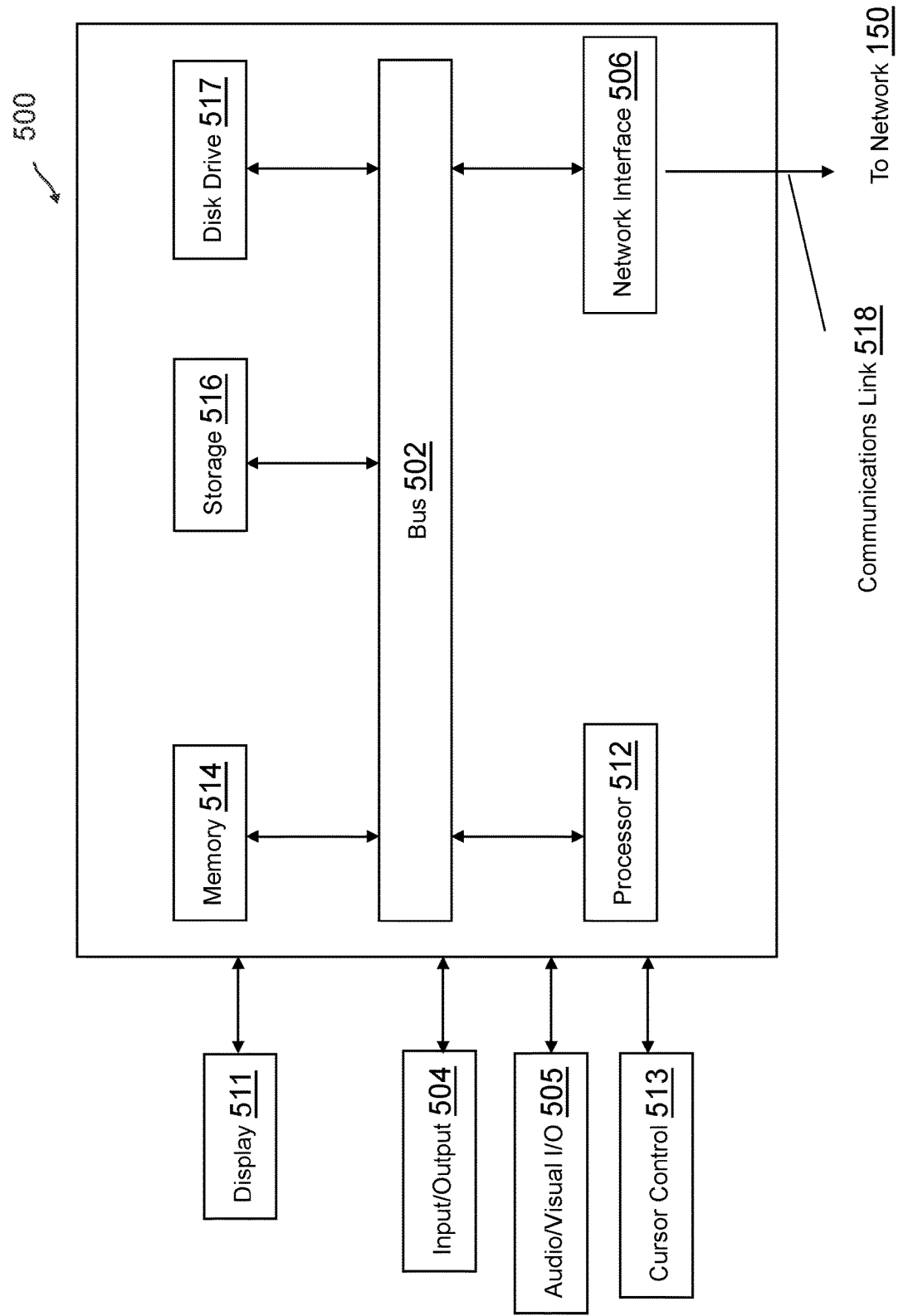
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A computing system comprising:
    a non-transitory memory; and
    one or more hardware processors coupled to the non-transitory memory and configured to read instructions from the non-transitory memory to cause the computing system to perform operations comprising:
        receiving an IP address blocklist for a plurality of IP addresses based on a plurality of IP address blocking rules, wherein the IP address blocklist designates the plurality of IP addresses for blocking by a plurality of components of the computing system;
        executing an integrity check of the IP address blocklist using a plurality of audit rules that determine whether each of the plurality of IP address blocking rules is meeting or exceeding a threshold blocking indicator for the IP address blocklist;
        determining that a first one of the plurality of IP address blocking rules is meeting or exceeding the threshold blocking indicator based on the plurality of audit rules;
        running the first one of the plurality of IP address blocking rules on a separate computing node from a current node utilizing the first one of the plurality of IP address blocking rules when processing the plurality of IP addresses;
        determining, based on the running, that the first one of the plurality of IP address blocking rules is causing results that differ from a baseline blocking result when blocking the subset of the plurality of IP addresses;
        removing a subset of the plurality of IP addresses for blocking in the IP address blocklist based on the first one of the plurality of IP addresses causing the results that differ from the baseline blocking result;
        executing a quarantine operation for the first one of the plurality of IP address blocking rules with the IP address blocklist, wherein the quarantine operation includes removing the first one of the plurality of IP address from use in a production computing environment;
        testing, in a test computing environment separate from the production computing environment, the first one of the plurality of IP address blocking rules for a return to the baseline blocking result based on the threshold blocking indicator; and
        enabling, based on the testing, the first one of the plurality of IP address blocking rules when the first one of the plurality of IP address blocking rules returns to the baseline blocking result.

2. The computing system of claim 1, wherein prior to the receiving the IP address blocklist, the operations further comprise:
    receiving a plurality of network traffic logs from the plurality of IP addresses over a time period, wherein each of the plurality of network traffic logs comprises a plurality of attributes; and
    determining, based on the plurality of attributes and the plurality of IP address blocking rules, the plurality of IP addresses indicate malicious network traffic for the plurality of network traffic logs.

3. The computing system of claim 1, wherein the executing the quarantine operation comprises at least one of:

removing the first one of the plurality of IP address blocking rules from a network traffic audit rules pool for a service provider associated with the computing system; or preventing the subset of the plurality of IP addresses identified by the first one of the plurality of IP address blocking rules from being proliferated in the IP address blocklist to one or more components of the computing system.

4. The computing system of claim 1, wherein the determining that the first one of the plurality of IP address blocking rules is meeting or exceeding the threshold blocking indicator comprises:

determining that a number of the subset of the plurality of IP addresses detected over a time period meets or exceeds the threshold blocking indicator for at least one of the plurality of audit rules.

5. The computing system of claim 1, wherein the IP address blocklist is generated for the plurality of IP address blocking rules by an automated blocking controller for the computing system.

6. The computing system of claim 5, wherein the automated blocking controller comprises a processing unit in a computing layer between network traffic for the plurality of IP addresses and data processes for the computing system.

7. The computing system of claim 1, wherein the removing the subset of the plurality of IP addresses is further based on a second one of the plurality of IP address blocking rules identifying the subset with the first one of the plurality of IP address blocking rules.

8. The computing system of claim 1, wherein the plurality of audit rules are based on at least one of a job processing error associated with the plurality of IP addresses, an execution failure associated with the plurality of IP addresses, a number of the plurality of IP addresses being in an IP address whitelist, or a number of the plurality of IP addresses detected by the first one of the plurality of the IP address blocking rules detected within a time frame.

9. The computing system of claim 1, wherein the determining that the first one of the plurality of IP address blocking rules is meeting or exceeding the threshold blocking indicator further comprises:

determining that a test solve rate associated with human verification tests is below or at a threshold test solve rate.

10. The computing system of claim 1, wherein the quarantine operation comprises preventing the first one of the plurality of IP address blocking rules from being utilized with an IP address blocking system of the computing system.

11. A method comprising:

accessing an IP address blocklist comprising IP addresses that are to be blocked when utilized with a computing system of a service provider;

determining a set of the IP addresses that are identified for blocking based on an IP address blocking rule;

determining, based on the set of the IP addresses, that the IP address blocking rule violates a rule behavioral requirement when identifying the set of the IP addresses based on a first auditing rule for the IP address blocking rule;

determining, based on an execution of the IP address blocking rule on a separate computing node, that the IP address blocking rule is causing results inconsistent with a baseline blocking result when blocking the set of the IP addresses;

executing an action with at least one of the set of the IP addresses or the IP address blocking rule for the computing system of the service provider, wherein the action comprises removing the IP address blocking rule from use in a production computing environment;

testing, in a test computing environment separate from the production computing environment, the IP address blocking rule for a return to the baseline blocking result based on the rule behavioral requirement; and enabling, based on the testing, the IP address blocking rule when the IP address blocking rule returns to the baseline blocking result.

12. The method of claim 11, wherein the action further comprises removing the set of the IP addresses from the IP address blocklist during an iteration of the IP address blocklist that is proliferated to a plurality of computing components of the computing system for the service provider.

13. The method of claim 11, wherein the executing the action further comprises removing the IP address blocking rule from a pool of IP address blocking rules used to filter IP addresses by the service provider.

14. The method of claim 13, wherein, prior to the enabling, the method further comprises:

determining that the IP address blocking rule is no longer violating the rule behavioral requirement based on the testing.

15. The method of claim 14, wherein the determining that the IP address blocking rule is no longer violating the rule behavioral requirement is further based on one or more of a threshold IP address blocking rate for the first auditing rule or a data scientist response to the determining that the IP address blocking rule is violating the rule behavioral requirement.

16. The method of claim 11, wherein the first auditing rule comprises one of a plurality of auditing rules, and wherein the determining that the IP address blocking rule is violating the rule behavioral requirement is based on at least one second auditing rules.

17. A non-transitory machine-readable medium having stored thereon machine-readable instructions executable to cause a machine to perform operations comprising:

accessing a plurality of IP addresses for blocking from use with a computing system based on an IP address blocking rule;

determining that the plurality of IP addresses identified by the IP address blocking rule meets or exceeds a threshold number of blocked IP addresses;

determining, based on an execution of the IP address blocking rule on a separate computing node, that the IP address blocking rule is causing different results from a baseline blocking result when blocking the plurality of the IP addresses;

identifying an integrity check of the IP address blocking rule;

executing the integrity check using at least one audit rule for the IP address blocking rule;

executing an action with at least one of the plurality of IP addresses or the IP address blocking rule, wherein the action comprises removing the IP address blocking rule from use in a production computing environment;

testing, in a test computing environment separate from the production computing environment, the IP address blocking rule for a return to the baseline blocking result based on the rule behavioral requirement; and enabling, based on the testing, the IP address blocking rule when the IP address blocking rule returns to the baseline blocking result.

18. The non-transitory machine-readable medium of claim 17, wherein the IP address blocking rule comprises at least one malicious network traffic log rule for network traffic logs associated with network traffic processed by the computing system.

19. The non-transitory machine-readable medium of claim 17, wherein the at least one audit rule comprises one or more of an IP address blocking number threshold, an IP address blocking frequency threshold, or an IP address blocking regional threshold.

20. The non-transitory machine-readable medium of claim 17, wherein the operations further comprise:
responsive to the executing the action, removing the IP address blocking rule from usage with blocking at least the plurality of IP addresses when used by the computing system for a time period.

* * * * *